Patented Mar. 17, 1942

2,277,015

UNITED STATES PATENT OFFICE 2,277,015

PREPARATION OF ORGANIC COMPOUNDS

Herbert H. Guest, West Hartford, Conn., assignor to The J. B. Williams Company, Glastonbury, Conn., a corporation of Connecticut No Drawing. Application November 9, 1937, Serial No. 173,608

21 Claims. (Cl. 260—404)

This invention relates to the production of organic compounds and particularly to the production of compounds useful as detergents or as emulsifying or wetting agents.

It is an object of this invention to provide a new product suitable for use as a detergent or in a soapless shampoo or to replace part or all of the soap in a dentifrice or detergent. Another object is to provide an improved procedure for producing such a product. Other objects will become apparent.

In carrying out the present invention, a hydroxyalkyl amine containing at least one hydrogen atom connected directly to the nitrogen of the amine group may be heated with an ester of a halogenated acid of the fatty acid series, preferably in the presence of a high boiling solvent for the amine and the ester.

As a specific example of the process, 50 parts by weight of methyl alpha bromo myristate, carefully purified, colorless and free from dibromo ester, may be heated with 50 parts of diethanolamine and 50 parts of diethylene glycol. The mixture is heated at a temperature of about 180 to 200° C. for about 60 to 90 minutes with stirring and refluxing of the solvent. The solvent and alcohol formed by the reaction are then removed by distillation, preferably at reduced pressure. The ester of the halogenated acid is believed to react with the diethanolamine in accordance with the following formula, where R represents the remainder of the fatty acid radical of the halogenated acid:

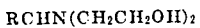
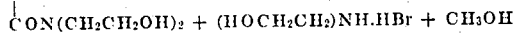

As indicated by this formula, hydrogen bromide from the ester combines with the diethanolamine to form a hydrobromide of diethanolamine and an amino-acid amide. The hydrobromide of diethanolamine is very soluble in the reaction mixture. The halide may be separated from this compound by addition of sodium or potassium hydroxide which precipitates the halide as the alkali salt and frees the diethanolamine for further use. Thus a quantity of potassium hydroxide (8¾ parts by weight), dissolved in a large excess of ethyl alcohol (100 parts by weight), may be added to the reaction mixture described above. The potassium bromide which separates may be removed by filtration. The alcohol may be distilled off and the residue can be used without further purification.

The resulting amino-acid amide is suitable for use as a substitute for soap in soapless shampoos, detergents and dentifrices. It is also useful as an emulsifying and wetting agent and as a binder for binding gasoline and alcohol.

Other saturated or unsaturated aliphatic hydrocarbon radicals containing from 6 to 22 and preferably about 8 to 18 carbon atoms, may be used in place of the myristate. Hydrocarbon radicals containing 12 to 18 carbon atoms are particularly useful. Also, other halogens (such as chlorine or iodine) may be substituted for the bromine in the alpha halogenated ester. The methyl radical may also be replaced by other alkyl radicals. Examples of other compounds useful for this purpose are methyl bromo laurate and ethyl chlorostearate. Many other suitable compounds will be apparent from the examples given.

Other solvents may also be used, such solvents being preferably ones that completely dissolve the hydroxyalkyl amine and that at least partially dissolve the halogenated ester of the aliphatic acid and which are of sufficiently high boiling point to avoid loss during the heating and refluxing (preferably having a boiling point of 160° C. or more). Diethylene glycol or the ethyl or butyl ethers of diethylene glycol or high boiling monohydric alcohols are examples of suitable solvents. Other hydroxyalkyl amines containing at least one hydrogen atom connected to the nitrogen of the amino group may be used in place of the diethanolamine. For example, the monoethanolamine or amines containing other alkyl groups of the same or different types may be used in place of the ethanolamine.

It is preferred to use an excess of the amine over the molecular reacting proportions as indicated in the example given. This excess may be removed, along with the solvent, during the distillation under reduced pressure. This distillation may, for example, be carried out at a temperature of about 160 to 190° C. and at an absolute pressure of about 5 to 20 millimeters of mercury. Operating at 175° C. and 10 millimeters of pressure, for example, the distillation may be continued until the weight of distillate is approximately equal to the weight of solvent and excess amine.

The amount of solvent should be sufficient to form a homogeneous solution on heating. An excess does no harm in the reaction and may be removed during the vacuum distillation, or otherwise.

The particular temperatures, proportions, times, etc. given in this application are merely illustrative and are not intended to limit the scope of the invention. The terms used in describing the invention have been used in their descriptive sense and not as terms of limitation and it is intended that all equivalents thereof be included within the scope of the appended claims.

No claim is made herein to particular uses of the products described herein, which are claimed in applicant's copending application, Serial No. 379,911, filed February 21, 1941.

I claim:

1. A method for producing an organic compound comprising heating a member of the group consisting of mono- and dialkylolamines, containing at least one hydrogen atom connected to the nitrogen of the amino group, with an ester of an alpha halogenated aliphatic monocarboxylic acid containing 6 to 22 carbon atoms, in the presence of a high boiling solvent for the amine and the ester, which solvent is substantially inert to the reactants under the conditions of operation.

2. A method for producing an organic compound comprising heating a member of the group consisting of mono- and dialkylolamines, containing at least one hydrogen atom connected to the nitrogen of the amino group, with an ester of an alpha halogenated aliphatic monocarboxylic acid containing 12 to 18 carbon atoms in the presence of and while refluxing a high boiling solvent for the amine and the ester.

3. A method for producing an organic compound comprising heating a compound of the group consisting of mono- and diethanolamines with an alkyl ester of an alpha halogenated fatty acid containing 8 to 18 carbon atoms, in the presence of a solvent for the amine and the ester having a boiling point of about 160° C. or more, which solvent is substantially inert to the reactants under the conditions of operation, to a temperature of about 170 to 210° C.

4. A method for producing an organic compound comprising heating diethanolamine, with an alkyl ester of an alpha halogenated fatty acid containing 12 to 18 carbon atoms, in the presence of diethylene glycol to a temperature of 180 to 200° C. while refluxing the solvent.

5. A method for producing an organic compound comprising heating a member of the group consisting of mono- and dialkylolamines, containing at least one hydrogen atom connected to the nitrogen of the amino group, with an ester of an alpha halogenated aliphatic monocarboxylic acid containing 6 to 22 carbon atoms in the aliphatic radical, and adding an alkali hydroxide to the mixture.

6. A method for producing an organic compound comprising heating a member of the group consisting of mono- and dialkylolamines, containing at least one hydrogen atom connected to the nitrogen of the amino group, with an ester of an alpha halogenated aliphatic monocarboxylic acid containing 6 to 22 carbon atoms, in the presence of a high boiling solvent for the amine and the ester, which solvent is substantially inert to the reactants under the conditions of operation, distilling off the solvent and adding an alkali hydroxide to the mixture.

7. A method for producing an organic compound comprising heating a member of the group consisting of mono- and dialkylolamines, containing at least one hydrogen atom connected to the nitrogen of the amino group, with an ester of an alpha halogenated aliphatic monocarboxylic acid containing 6 to 22 carbon atoms, in the presence of a high boiling solvent for the amine and the ester, which solvent is substantially inert to the reactants under the conditions of operation, distilling off the solvent, adding an alkali hydroxide to the mixture, filtering to remove the alkali halide.

8. A method for producing an organic compound comprising heating a compound of the group consisting of mono- and diethanolamines with an alkyl ester of an alpha halogenated fatty acid, containing 8 to 18 carbon atoms, in the presence of a mutual solvent having a boiling point of about 160° C. or over, which solvent is substantially inert to the reactants under the conditions of operation, to a temperature of about 170 to 210° C. while refluxing the solvent, removing the solvent, adding an alkali hydroxide in alcohol, filtering the mixture to remove alkali halide, and removing the alcohol.

9. A method for producing an organic compound useful as a detergent, comprising heating a member of the group consisting of mono- and dialkylolamines, containing at least one hydrogen atom connected to the nitrogen of the amine, with an alkyl ester of an alpha bromo aliphatic monocarboxylic acid containing 8 to 18 carbon atoms and adding an alkali hydroxide to the resulting mixture.

10. A method for preparing an organic compound suitable for use as a detergent, comprising adding diethanolamine and diethylene glycol to methyl alpha bromo myristate and heating the mixture at about 180 to 200° C. for about 60 to 90 minutes while stirring and refluxing the solvent, removing the solvent and adding potassium hydroxide dissolved in ethyl alcohol, filtering the mixture to remove potassium bromide, and distilling to remove the alcohol.

11. A new product resulting from the heating of an ester of an alpha halogenated aliphatic monocarboxylic acid containing 6 to 22 carbon atoms in the aliphatic radical with a member of the group consisting of mono- and dialkylolamines, containing at least one hydrogen atom connected to the nitrogen of the amino group, in the presence of a solvent for the ester and the amine, which solvent is substantially inert to the reactants under the conditions of operation.

12. A new product resulting from the heating of an ester of an alpha halogenated aliphatic monocarboxylic acid containing 12 to 20 carbon atoms with an ethanolamine having at least one hydrogen atom connected to the nitrogen of the amino group, in the presence of and while refluxing a mutual solvent for the ester and the amine, which solvent is substantially inert to the reactants under the conditions of operation, and distilling the mixture under reduced pressure to remove solvent.

13. A new product resulting from the heating of an ester of an alpha halogenated aliphatic monocarboxylic acid containing 6 to 22 carbon atoms in the aliphatic radical with a member of the group consisting of mono- and dialkylolamines containing at least one hydrogen atom connected to the nitrogen of the amino group, and treating the resultant product with an alkali hydroxide.

14. A new product resulting from the heating of an ester of an alpha halogenated aliphatic monocarboxylic aliphatic acid containing 6 to 22 carbon atoms at about 170 to 210° C. with a member of the group consisting of mono- and dialkylolamines containing at least one hydrogen atom connected to the nitrogen of the amino group, in the presence of and while refluxing a high boiling solvent for the amine and the ester, which solvent is substantially inert to the reactants under the conditions of operation, removing the solvent, treating the product with potassium hydroxide in an alcohol, and removing the potassium halide and alcohol.

15. A new product resulting from heating methyl alpha bromo myristate with diethanolamine and diethylene glycol at a temperature of about 180 to 200° C. while agitating and refluxing, distilling off the solvent under reduced pressure, adding an alcohol solution of potassium hydroxide, filtering, and distilling off the alcohol.

16. A method for producing an organic compound comprising heating a compound of the class consisting of mono- and dialkylolamines, containing at least one hydrogen atom connected to the nitrogen of the amino group, with an ester of an alpha halogenated aliphatic monocarboxylic acid containing 6 to 22 carbon atoms in the aliphatic radical.

17. A method for producing an organic compound, comprising heating a compound of the class consisting of mono- and dialkylolamines, containing at least one hydrogen atom connected to the nitrogen of the amino group, with an ester of an alpha halogenated aliphatic monocarboxylic acid containing 6 to 22 carbon atoms in the aliphatic radical in the presence of a solvent for the amine and the ester, which solvent is substantially inert to the reactants under the conditions of operation.

18. A new product resulting from the heating of an ester of an alpha halogenated aliphatic monocarboxylic acid containing 6 to 22 carbon atoms in the aliphatic radical with a compound of the class consisting of mono- and dialkylolamines containing at least one hydrogen atom connected to the nitrogen of the amino group.

19. As a new product of manufacture, an alkylol amide of an alkylol amino aliphatic acid containing 6 to 22 carbon atoms in the aliphatic radical.

20. As a new product of manufacture, a dialkylol amide of a dialkylol amino aliphatic acid containing 6 to 22 carbon atoms in the aliphatic radical.

21. As a new product of manufacture, a diethanol amide of a diethanol amino aliphatic acid containing 6 to 22 carbon atoms in the aliphatic radical.

HERBERT H. GUEST.